Patented Feb. 14, 1928.

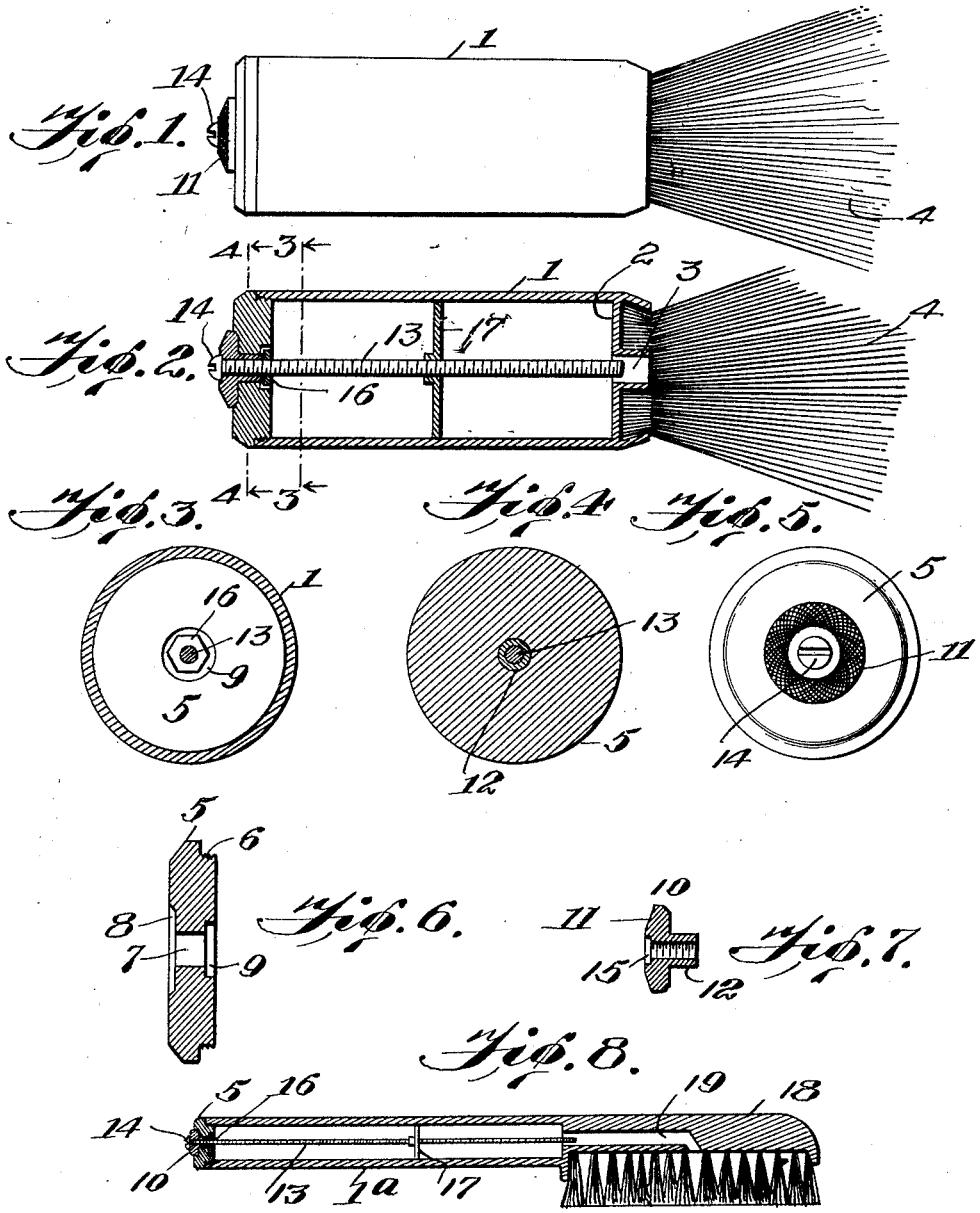

1,659,199

UNITED STATES PATENT OFFICE.

HERMAN HANSON, OF LA CROSSE, WISCONSIN.

DISPENSING DEVICE.

Application filed March 5, 1927. Serial No. 173,073.

This invention relates to dispensing devices, and particularly to such brushes as shaving brushes, tooth brushes and the like.

The object of the invention is the provision of simple and efficient means for carrying a semiliquefied soap or a suitable dentifrice in a brush and being able to discharge same at the will of the operator into or upon the bristles of the brush, when the brush is to be used.

Another object of the invention is the construction of an efficient ejecting means, on the body of the brush, whereby the contents of the body, such as paste-like soap or dentifrice, can be discharged by the operator onto the bristles in small quantities, as required.

With these and other objects in view, my invention comprises certain novel constructions, combinations, and arrangements of parts as will be hereinafter fully described, illustrated in the accompanying drawings, and more particularly pointed out in the appended claims.

In the drawings:

Figure 1 is a view in side elevation of a shaving brush constructed in accordance with the present invention, while Figure 2 is a longitudinal, vertical, central sectional view of the same.

Figure 3 is a sectional view taken on line 3—3, Figure 2 and looking in the direction of the arrows.

Figure 4 is a sectional view taken on line 4—4, Figure 2 and looking in the direction of the arrows.

Figure 5 is an end view of the brush, as shown in Figures 1, 2 and 8.

Figure 6 is an enlarged sectional view of the cap.

Figure 7 is an enlarged sectional view of the primary nut.

Figure 8 is a longitudinal sectional view of a tooth brush constructed in accordance with the present invention.

Referring to the drawings by numerals, 1 designates a cylindrical body, which is closed by a partition 2 near one end, having a tubular extension 3, through which the paste-like soap, ordinarily contained in body 1, is permitted to pass into, and upon, the bristles 4.

The outer end of body 1 is internally screw threaded, and the cap 5 is provided with external screw threads 6 (Fig. 6) that screw into the internal screw threads of body 1, as shown in Figure 2. This cap 5 is provided with a large central opening 7, which opening 7 communicates at its outer end with outer socket 8, and at its inner end it communicates with inner socket 9.

The primary nut 10 comprises a head 11 with an integral inwardly extending sleeve 12; both the head and sleeve are internally screw threaded for receiving the long screw 13. On the outer end of screw 13 is an integral head 14, which head 14 is partly seated in socket 15, formed in head 11, of primary nut 10, so that the head 14, of screw 13 can seat snugly down into the head 11 of primary nut 10. The sleeve 12 is longer than the opening 7, so that the inner end of sleeve 12 extends quite a little distance into socket 9, thereby permitting lock nut 16 to be tightly screwed against the inner end of sleeve 12, within socket 9, whereby when the operator turns, or screws upon primary nut 10, screw 13 will be rotated for causing the disc-like follower 17 to travel within the cylindrical body 1, pressing upon the contents of said body forcing it out through the tubular extension 3.

To facilitate the operator grasping the head 11 of primary nut 10, said head is roughened or serrated, as shown in Figures 1 and 5.

In Figure 8, I have shown how my invention can be adapted to a tooth brush. In this embodiment, the body 1ª is provided with a head 18, in which head is a passage 19 through which the dentifrice can be forced into the bristles.

Ordinary shaving cream, such as found on the market today, can be placed in the interior or "chamber" of the cylindrical body 1, and then, as the operator shaves a small quantity can be quickly forced by follower 17, into the bristles, as needed. In this way, the shaving process is more economical, as only the actual needed quantity of shaving cream or paste-like soap is required, without any waste, such as is usually the case if a mug is used. Further, the dentifrice, ordinarily obtained in tubes on the market today, can be placed in the body 1ª of the tooth brush shown in Figure 8, and likewise, as needed the dentifrice can be used by the operator without any waste.

I have found from actual experience with a working model that my improved device, over the prior art, can be quickly and positively assembled, and that it will operate efficiently, in the manner specified.

While I have described the preferred embodiments of my invention and illustrated the same in the accompanying drawings, certain minor changes or alterations may appear to one skilled in the art to which this invention relates during the extensive manufacture of the same, and I, therefore, reserve the right to make such changes or alterations as shall fairly fall within the scope of the appended claims.

What I claim is:

1. In a dispensing device, the combination of a cylindrical body provided at one end with internal screw threads, a cap screwed into said internal screw threads, a primary nut extending through said cap, a long screw threaded through said primary nut, a lock nut on said screw and tightly against part of said primary nut, and a follower movably mounted on said screw within said cylindrical body.

2. In a dispensing device, the combination of a cylindrical body provided at one end with internal screw threads, a cap threaded into said internally threaded end of the body with part of the cap against the outer end of said body, said cap provided with a large central opening and with an outer socket at the outer end of said opening, said cap provided with an inner socket at the inner end of said opening, a primary nut comprising a head partly seated in said outer opening of the cap, said head being integral with a sleeve, said sleeve and head being internally threaded, said head provided with a socket, a screw threaded through said head and sleeve of said primary nut, said screw provided with a head in said socket of the head of the primary nut, said sleeve of greater length than said central opening of said cap, whereby said sleeve extends into said inner socket of said cap, a lock nut on said screw and within said inner socket of said cap and tightly engaging the end of said sleeve within said inner socket, said lock nut being spaced entirely from the walls of said inner socket for allowing free rotation of the screw without moving said cap, and a follower within said cylindrical body and threaded upon said screw.

3. In a dispensing device the combination of a hollow body, a cap on said body, a primary nut rotatably mounted on said cap and extending through the same, a screw extending through said primary nut, a lock nut on said screw and tightly binding upon said primary nut, and a follower in said hollow body and threaded on said screw.

4. In a dispensing device, the combination of a hollow body, a cap on said hollow body, a nut with a sleeve on said cap, said sleeve extending through said cap, a screw extending through said nut and its sleeve, a lock nut on said screw and tightly binding against the inner end of said sleeve, and a follower on said screw within said hollow body.

In testimony whereof I hereunto affix my signature.

HERMAN HANSON.